United States Patent

Bässler et al.

[11] 4,030,525
[45] June 21, 1977

[54] CORROSION-RESISTANT SHEET STEEL WELD

[75] Inventors: Gerd Bässler, Kornwestheim; Arno Altpeter, Sindelfingen, both of Germany

[73] Assignee: Robert Bosch G.m.b.H., Stuttgart, Germany

[22] Filed: July 18, 1975

[21] Appl. No.: 596,988

[30] Foreign Application Priority Data

July 18, 1974 Germany .......................... 2434519

[52] U.S. Cl. ............................... 428/586; 428/594; 428/659; 138/151; 138/171; 219/86; 219/87; 138/145
[51] Int. Cl.[2] ....................... F16L 9/16; B32B 15/18
[58] Field of Search .................. 219/91, 76, 86, 87; 228/165, 166, 287; 29/196.1, 196.5, 191.6; 138/145, 151, 171

[56] References Cited

UNITED STATES PATENTS 3,510,624   5/1970   Bennett ............................... 219/91

Primary Examiner—Arthur J. Steiner
Attorney, Agent, or Firm—Flynn & Frishauf

[57] ABSTRACT

To prevent flowing of coating material on corrosion-protected sheet steel, such as a zinc coating, when making overlap weld seams, the end portion of at least one of the steel sheets is formed with openings which extend from adjacent the outer edge of the end portion inwardly, to leave projections between the openings, the projections being entirely within the overlap and leaving a short strip of solid material in the overlap region, so that the weld will occur at concentrated hot spots of the material, and contamination of the welding electrodes by the zinc coating material is prevented. The openings may extend clear to the edge in the form of notches, leaving intervening teeth, or they may be punched holes.

13 Claims, 7 Drawing Figures

Fig. 7

$$Q = 0.239 \int_0^t I^2 \cdot R \cdot dt \quad \ldots\ldots\ldots (1)$$

Fig. 7
$$Q = 0.239 \int_o^t I^2 \cdot R \cdot dt \quad \ldots\ldots\ldots (1)$$
Fig. 1
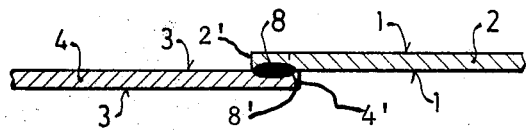
Fig. 2
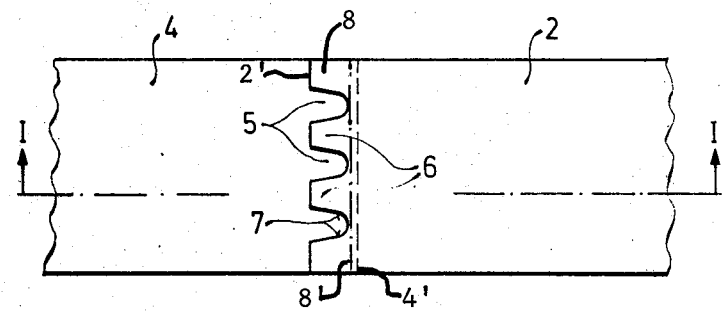
Fig. 3
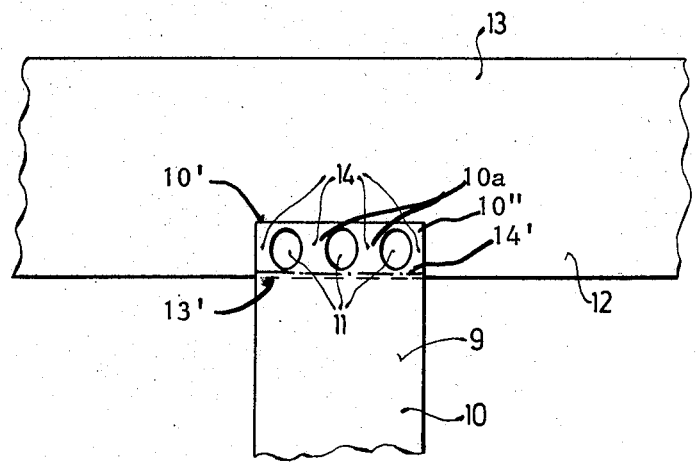

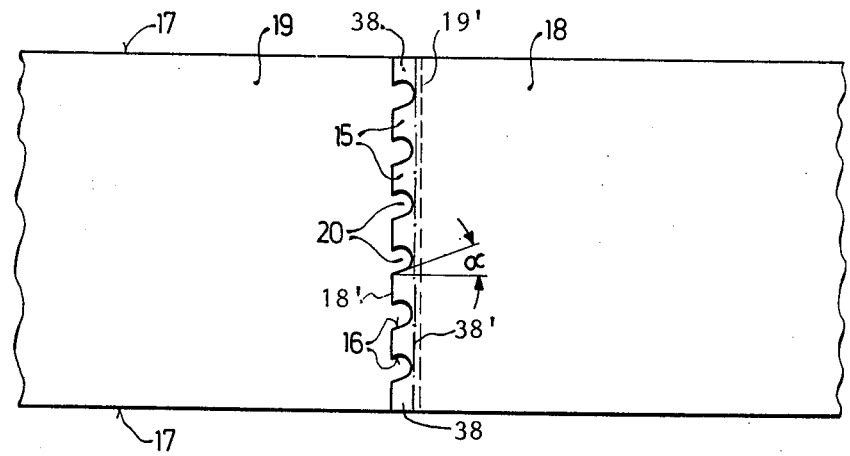
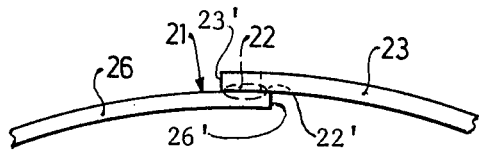
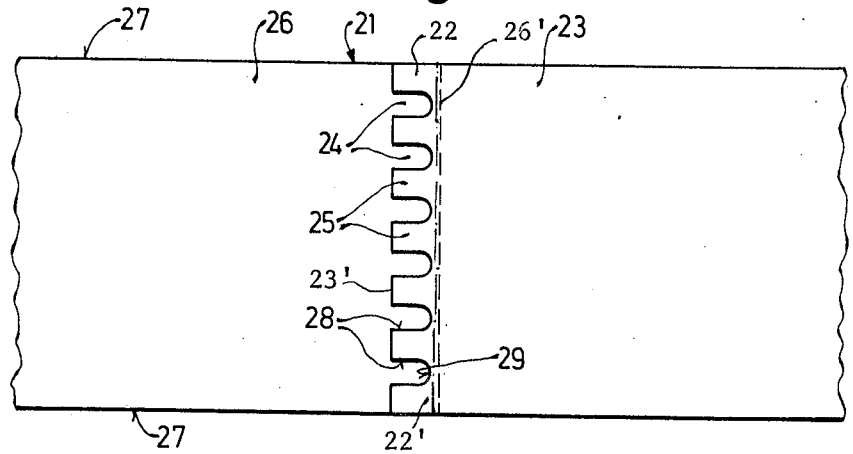

CORROSION-RESISTANT SHEET STEEL WELD

The present invention relates to the art of welding together strips of sheet steel in which the sheet steel is covered with a metal coating to inhibit corrosion of the steel, and more particularly to a weld structure, and a method of making the weld structure by overlapping the individual sheet elements.

Sheet steel, and particularly endless steel tapes or bands are frequently coated with a metal which protects the steel against corrosion. To make tubing out of such sheet steel it has been customary to bend the strip and bring the ends together, to overlap the ends and then weld the overlapping end portions together, thus providing a ring-shaped or tubular structure. The welding step is carried out by electrical resistance welding. After welding the steel, the shaped ring or tube is covered with a metal coating to protect the steel against corrosion. Typical metal coatings are aluminum, lead, cadmium, chromium, copper, brass, nickel, tin, or zinc. These metals are typically applied by galvanic deposition.

It is expensive and cumbersome to treat an endless tape or strip by galvanic deposition after it has been bent and welded together. To decrease costs, it has been proposed to start with a steel strip which is already covered with a corrosion-protective metal coating, for example zinc, and then weld the strip into the desired shape. The protective coating can be applied already when the sheet metal strip is made, for example by hot-galvanizing or pot-galvanizing the sheet strip.

Hot-galvanized sheet strips can be readily worked. Upon cutting, contour-punching, or hole-punching of such strips, the protected metal is also pressed on the cut surface so that sufficient protection of the steel against corrosion is also obtained at the edge or cut surface of the strip. Difficulty arises, however, upon resistance welding of sheet steel which has a protective coating made of zinc. This is due to the vast differences in electrical characteristics between zinc and steel.

The electrical resistance of zinc is about half that of steel. When electrically resistance welding zinc-coated steel, the zinc will liquefy. The contact resistance between an electrode and liquefied zinc is less than that between the electrode and zinc in solid state. Zinc melts at 419.5° C, whereas steel melts at 1450° to 1530° C. The low contact resistance obtains not only between the electrode and the molten zinc of the section of the zinc-coated steel beneath the electrode, but also between the two zinc coatings of the overlapping regions or zones of the sheet metal which are to be welded together.

The resistance heat or Joule heat which has to be generated in order to weld zinc-coated steel can be calculated, for a certain welding time, in accordance with relationship (1), in which Q = heat in calories; I = current in A; R = ohmic resistance in ohms; $t$ = duration of welding, in seconds; 0.239 = the electrical thermal equivalent of 1 Ws = 0.239 cal.

Comparing the welding of uncoated sheet steel with zinc-coated sheet steel by electrical resistance heating, in the light of the relationship (1), shows that the current must be substantially increased if the welding time is to be maintained constant. It has been found by experience that approximately 1.3 to 1.5 times the current is required to weld zinc-coated sheet steel, when compared with the welding of uncoated sheet steel. The heat generated at the electrodes is based on the square of the current, so that the heat generated is the $1.3^2$ to $1.5^2$ heat in comparison with that which is required to weld uncoated sheet steel.

Zinc has a very active tendency to alloy with the electrodes, which usually are made of copper or a copper alloy, and, in any event, a much higher affinity to the copper or copper alloys of the electrodes than steel.

When welding strip steel one must consider:
1. The material of the electrodes, usually a copper alloy, reacts and alloys with the protective zinc coating so that the electrodes frequently become useless after only 50 to 100 welding operations.
2. Zinc melts at about 420° C.
3. The zinc coating flows away from the steel in the region of the weld. The corrosion resistance of the steel at the weld point is thus impaired or entirely removed. The work piece may thus become useless for many desired applications where effective corrosion protection of the steel is required.

It has previously been proposed to deform the end portion of the steel strip which is coated with zinc by forming bumps or bulges therein, so-called welding tips. Little success was achieved thereby since these welding tips are flattened upon welding due to the pressure applied by the electrodes, particularly when thin strip sheet steel is to be welded together. The electrode pressure, as well as the heat generated upon welding, flattens out these welding tips.

It is an object of the present invention to improve the art of welding of corrosion resistance coating sheet steel so that such coated sheet steel can be effectively, reliably and economically welded. The weld should have the properties of:
1. a weld seam of high strength, which can tolerate bending of the seam, creasing or scoring, or otherwise deforming the strip of sheet steel;
2. alloying of the electrodes with a metal of the work piece should be effectively avoided so that the use time of the electrodes is not impaired, that is, to provide an effective use time of the electrodes which is comparable to that of welding uncoated strip and at least capable of several thousand welds; and
3. the corrosion-resistant coating should be retained at the weld to provide sufficient and adequate protection of the base metal (steel) by the coating metal.

Subject matter of the present invention:

Briefly, at least one of two overlapping end portions of the strip steel are formed with openings preferably equally spaced from each other, which openings are covered by the end portion of the other strip in the region of overlap of the two strips. These openings may be formed as open notches, leaving tooth-shaped projections therebetween, or may be punched holes, leaving terminal bridges.

The openings in the region of overlap of the strip steel result in a decrease of the area to be welded, and essentially a restriction of the weld to the projections between the openings. This results in an increase in current density upon resistance welding, that is, current per unit area. The projections thus have an effect which is somewhat similar to the welding tips or welding projections without, however, losing their effectiveness, as the welding tips do upon actual welding together of the superimposed, overlapped strip elements. The openings or recesses between the projections permit a substantial increase of current density, and hence a decrease of the total current used when welding, keeping the time constant by decreasing the welding current by about one-third. It is, therefore, possible to operate with only two-thirds of that current as previously used and to weld overlapped strip steel without having the notches or openings formed therein. The resistance heat, or Joule heat, generated upon welding is decreased by the square of the current, that is, to about 4/9, that is, slightly less than half. As a result, the tendency of the protective metal to alloy with the electrodes is so decreased that the use time of the electrodes is dramatically increased. An increase in use time from several ten to a few thousand welds has been obtained.

Overlapping the recesses or openings of one strip with the end portion of the other strip has the additional advantage that the protective metal which is momentarily liquefied will collect in the openings to provide for increased protection of the steel against corrosion at the openings, which is exactly the point where it is most needed since protection against fissures is thereby obtained. The overall strength of the weld seam is so great that deformation of the strip after welding, even extensive deformation, is readily possible. The weld can be bent over, or an edge transverse to the weld can be rolled over, or the weld can even be folded, without separation of the overlapped sheet metal elements.

The invention will be described by way of example with reference to the accompanying drawings, wherein:

FIG. 1 is a cross-sectional view of a weld of overlapped sheet metal elements, taken along line I—I of FIG. 2;

FIG. 2 is a top view of a zinc-coated steel strip having an overlapped weld seam with tooth-shaped projections on one of the overlapped end portions;

FIG. 3 is a top view of another embodiment having oval holes of the overlapped end portion of one strip element;

FIG. 4 is another embodiment illustrating tooth-shaped projections extending at an inclination with respect to the major direction of the strip steel;

FIG. 5 is an end view of the overlapped seam of a strip shaped to form a ring or tube in endless form;

FIG. 6 is a top view of an endless steel strip as shown in FIG. 5; and

FIG. 7 is the graphic reproduction of relationship (1).

Two steel sheet strip elements 2, 4 are zinc-coated at the top and bottom thereof as indicated by coatings 1 and 3, respectively. The zinc coating is applied by hot-galvanizing or pot-galvanizing of sheet strip, for example by using the Sendzimir process. This process provides a clean, uniform and well-adhering coating of zinc.

The upper strip 2 of the overlapped strips is formed with U-shaped recesses 5, leaving tooth-shaped projections 6 therebetween. The tooth-shaped projections, of which four are shown between the three openings 5, are equally spaced from each other. The projections 6 are narrower at their front portion than at their rear portion. The transition region 7 between the projections 6 and the solid steel strip 2 is rounded.

The overlapped regions of the upper strip 2 and the lower strip 4 are slightly greater than the depth of the notches or recesses 5, or the length of the teeth 6, respectively. The recesses 5 in the upper strip 2 are entirely covered by the overlapping region of the lower strip 4. A common weld seam 8, made by resistance welding, joins the coated steel strips 2, 4 at their interface in the region of the overlap. The inner extent of the weld 8, as illustrated by the chain-dotted line 8', is just inwardly of the edge 4' of the lower strip 4; it extends preferably to the edge, or at least almost to the edge 2' of the upper strip 2.

FIG. 3 shows a T-connection. The upper strip 10, coated on both sides with a zinc coating 9, is formed with three C-shaped oval holes 11, and placed in overlapping position on a lower strip 13 coated with a zinc coating 12 at least on the upper surface thereof. Strips 10 and 13 are located at right angles with respect to each other. The openings 11 are uniformly spaced from each other. Overlap of the two strips 10, 13, that is, the length with which the upper strip edge 10' extends over the lower strip 13, is slightly greater than the length of the O-shaped holes 11 measured in the direction of the major extent of strip 10. Thus, the openings 11 in the upper strip 10 are completely covered by the overlapped region of the lower strip 13. A common weld seam 14 is formed between the two coated steel strips 10, 13 in the region of overlap, the weld seam being made by electrical resistance welding. The projections 10a between holes 11 are joined by bridge 10''. The inner end of the weld seam may extend to the edge 13' of strip 13 or may terminate just short thereof, as indicated by chain-dotted line 14'.

The openings may be shaped in various ways; FIG. 4 illustrates tooth-shaped openings, in which the teeth 15, in contrast to FIGS. 1 and 2, have inclined flanks which are parallel with respect to each other. The inclined flanks 16 form an angle $\alpha$ with the lateral edges 14 of the steel strips 18, 19. The angle $\alpha$ is not critical; an angle of about 20° is suitable. The edges or flanks 16 defining the teeth between the recesses 20 are parallel to each other, in contrast to the embodiment of FIGS. 1 and 2 in which the projections 6 are narrower at their free end than at the inner end or root of the recesses. A weld seam 38 extends to a seam line 38' which is indicated by a chain-dotted line, and at the other side to the edge 18' of the upper strip 18. The weld seam 38 preferably stops just short of the terminal edge 19' of the lower strip 19.

FIGS. 5 and 6 illustrate a fragment of a tubular structure or ring, in which an endless ring 21 is made of zinc-coated steel by bending a strip in closed ring form, and forming overlapping regions which are connected by electrical resistance welding, as seen at weld 22. The upper portion 23 of steel strip 21 has six U-shaped recesses 24 and seven tooth-like projections 25, arranged uniformly over the width of the strip. The tooth-like projections 25 extend over the lower end part 26 of strip 21, and have flanks which extend parallel to the edges 27 of the strip 21. These flanks 28 of the projections 25, being parallel, thus result in projections which have the same width at their free end as at the root; the roots of the recesses 24 between the projections are rounded, and two adjacent prejections 25 are connected at their root end by a semicircular region 29, having a diameter which is equal to the width of the U-shaped recesses 24. By forming the transition between the straight flanks and the inner ends with a circle having the maximum possible radius of curvature, strength of the seam and the tooth-shaped projections 25 is substantially increased over projections which might terminate in sharp edges or other shapes which might lead to the formation of fissures, notches, or the like.

The region of overlap of the two elements 23, 26 of the strip 21 is slightly greater than the length of the projections 25, as in the other examples. This means, of course, that the length of the U-shaped notches 24 is also completely covered by the end portion of the lower strip element 26, and that the inner edge 26' of the element 26 extends beyond the innermost point of the recesses 24. The weld seam 22 extends from the ends or edges 23' of the projections 25 to just behind the roots of the recesses 24, or, in other words, to just ahead of the inner edge 26' of the lower element 26, as shown by the chain-dotted line 22'. The weld seam may, however, extend throughout the entire region of overlap, that is, from the edge 23' to the edge 26'; the extent of the weld, and the extent of the overlap will depend on the ultimate strength of the weld desired, and the characteristics of the metals to be welded, for example their thickness, thickness of coating, and heat transfer of the metals away from the weld. The relative dimensions of the recesses ad the projections with respect to a specific strip can be easily determined. In one example, a strip of steel 6 cm wide, and 0.8 mm thick, having a zinc coating 0.02 mm thick was formed with teeth of the shape of FIG. 6 which had a width of 2.2 mm, and a length of 2.2 mm; the overlap, that is, the distance between the edge 23' and the edge 26' was 2.5 mm, the weld extending approximately from the edge 23' to just beyond the roots of the notches, but the actual extent is difficult to control and may extend to the over-lapped edge in localized positions. Various changes and modification may be made and features described in connection with any one embodiment may be used with any one of the other, within the scope of the inventive concept.

We claim:
1. Corrosion-resistant sheet steel weld in which two overlapping steel sheets (2, 4; 10, 13; 18, 19; 21, 23, 26) are placed with their respective end portions in overlapping relationships comprising
   two overlapping steel sheets (2, 4; 10, 13; 18, 19; 21, 23, 26);
   a coating of corrosion-resistant metal (1, 3) at adjacent, overlapping surfaces of said sheets;
   a resistance weld seam (8, 14, 38, 22) formed at the interface of said sheets at least in the regions of the overlap of said projections and the other sheet;
   and means providing for localized current density upon welding comprising openings (5, 11, 20, 24) formed in at least the end portions of at least one of the steel sheets extending from adjacent the outer edge of the end portion inwardly in said end portion leaving projections (6, 15, 25) between said openings, said openings having a depth less than the extent of overlap of said sheets.
2. Weld seam according to claim 1, wherein the weld extends slightly beyond the roots of the openings.

3. Weld according to claim 2, wherein the region of overlap is slightly greater than the maximum depth of the openings.
4. Weld according to claim 1, wherein the openings and hence the projections are uniformly spaced along the edge of said at least one sheet.
5. Weld according to claim 1, wherein the openings are open notches (5, 20, 24) and the projections are projecting teeth (6, 15, 25).
6. Weld according to claim 1, wherein the openings are holes (11) formed in the sheet leaving a continuous edge (10") joining the projections (10a) between the holes (11) in the region adjacent the terminal edge (10') of the sheet (10).
7. Weld according to claim 1, wherein the two steel sheets are the end portions (23, 26) of a single strip bent end-to-end to form a tubular structure;
   said coating of corrosion resistant metal comprises a zinc coating applied to at least one of the surfaces of said strip;
   and wherein the weld seam (8, 38, 22) extends longitudinally of the tubular structure.
8. Weld according to claim 1, wherein (FIGS. 1, 2) the openings are open notches (5) and the projections are projecting teeth (6), said teeth are wider at their root portions than at their free portions, and merge with the respective steel sheet at a curved portion to shape the notches between the projections to have a maximum radius of curvature at their root ends.
9. Weld according to claim 1, wherein the projections (15, 25) are formed with essentially parallel flanks and the root portions of the openings have a radius of curvature which is half the distance between the projections.
10. Weld according to claim 1, wherein the openings are open notches (20) and the projections are projecting teeth (15), the projecting teeth having parallel flanks (16) arranged at an angle ($\alpha$) with respect to the side edges (17) of the steel sheets.
11. Weld according to claim 1, wherein said coating of corrosion-resistant metal comprises a zinc coating applied to at least one of the surfaces of said sheets.
12. Weld according to claim 11, wherein the openings are open notches (5, 20, 24) and the projections are projecting teeth (6, 15, 25), the openings and projections being essentially uniformly spaced along the edge of said at least one sheet;
   and wherein the seam extends slightly beyond the roots of the openings and the region of overlap is slightly greater than the maximum depth of the openings.
13. Weld according to claim 11, wherein the openings are holes (11) essentially uniformly spaced along the edge of said at least one sheet and formed in the sheet leaving a continuous edge (10") joining the projections (10a) between the holes (11) in the region adjacent the terminal edge (10') of the sheet (10);
   and wherein the weld seam extends slightly beyond the roots of the openings and the region of overlap is slightly greater than the maximum depth of the openings.

* * * * *

UNITED STATES PATENT AND TRADEMARK OFFICE
CERTIFICATE OF CORRECTION

PATENT NO. : 4,030,525
DATED : June 21, 1977
INVENTOR(S) : Gerd BASSLER et al

It is certified that error appears in the above-identified patent and that said Letters Patent are hereby corrected as shown below:

Claim 2, line 1, please insert -- seam -- after "weld" which was omitted

Signed and Sealed this

Twenty-seventh Day of September 1977

[SEAL]

Attest:

RUTH C. MASON
Attesting Officer

LUTRELLE F. PARKER
Acting Commissioner of Patents and Trademarks